United States Patent
Onaizi et al.

(10) Patent No.: US 12,428,590 B1
(45) Date of Patent: Sep. 30, 2025

(54) METHOD OF REMOVING HYDROGEN SULFIDE FROM A SUBTERRANEAN GEOLOGICAL FORMATION WITH A ZEOLITIC IMIDAZOLATE FRAMEWORK IN WASTE COOKING OIL-BASED DRILLING FLUIDS

(71) Applicant: KING FAHD UNIVERSITY OF PETROLEUM AND MINERALS, Dhahran (SA)

(72) Inventors: Sagheer A. Onaizi, Dhahran (SA); Mustapha Iddrisu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/622,674

(22) Filed: Mar. 29, 2024

(51) Int. Cl.
| | |
|---|---|
| *E21B 21/06* | (2006.01) |
| *C09K 8/34* | (2006.01) |
| *C09K 8/54* | (2006.01) |
| *E21B 41/00* | (2006.01) |

(52) U.S. Cl.
CPC ............... *C09K 8/54* (2013.01); *C09K 8/34* (2013.01); *E21B 21/062* (2013.01); *E21B 41/00* (2013.01); *C09K 2208/10* (2013.01); *C09K 2208/20* (2013.01); *C09K 2208/32* (2013.01)

(58) Field of Classification Search
CPC ........ C09K 8/54; C09K 8/34; C09K 2208/10; C09K 2208/20; C09K 2208/32; E21B 21/062
See application file for complete search history.

(56) References Cited

U.S. PATENT DOCUMENTS

| | | | |
|---|---|---|---|
| 3,928,211 A | 12/1975 | Browning et al. | |
| 4,631,136 A * | 12/1986 | Jones, III | C09K 8/34 507/139 |
| 8,480,792 B2 | 7/2013 | Yaghi et al. | |
| 8,920,541 B2 | 12/2014 | Ni et al. | |
| 11,708,517 B1 | 7/2023 | Onaizi | |
| 2017/0350225 A1 * | 12/2017 | Benoit | E21B 43/26 |
| 2019/0382650 A1 * | 12/2019 | Cairns | E21B 43/25 |
| 2020/0399524 A1 * | 12/2020 | Pisklak | C09K 8/592 |
| 2023/0001617 A1 * | 1/2023 | Kapelewski | B29C 48/022 |

OTHER PUBLICATIONS

Jameh et al.; Synthesis and modification of Zeolitic Imidazolate Framework (ZIF-8) nanoparticles as highly efficient adsorbent for H2S and CO2 removal from natural gas; Journal of Environmental Chemical Engineering, vol. 7, Issue 3; Jun. 2019; 6 Pages.

Iddrisu et al.; Waste to a commodity: the utilization of waste cooking oil for the formulation of oil-based drilling mud with HS scavenging capability bestowed by the incorporation of ZIF-67; Emergent Materials; Jul. 14, 2023; 11 Pages.

* cited by examiner

*Primary Examiner* — Silvana C Runyan

(74) *Attorney, Agent, or Firm* — Oblon, McClelland, Maier & Neustadt, L.L.P.

(57) ABSTRACT

A method of removing hydrogen sulfide from a subterranean geological formation includes mixing a zinc-imidazolate material, ZIF-8, in an amount of 0.1 to 2.5 percent by weight with an organic liquid containing one or more unsaturated oils to form a drilling fluid suspension with a pH of 10 or more. The method includes injecting the drilling fluid suspension in the subterranean geological formation, circulating the drilling fluid suspension in the subterranean geological formation to form an oil-based mud, and scavenging hydrogen sulfide from the subterranean geological formation.

18 Claims, 10 Drawing Sheets

METHOD OF REMOVING HYDROGEN SULFIDE FROM A SUBTERRANEAN GEOLOGICAL FORMATION WITH A ZEOLITIC IMIDAZOLATE FRAMEWORK IN WASTE COOKING OIL-BASED DRILLING FLUIDS

STATEMENT REGARDING PRIOR DISCLOSURE BY THE INVENTORS

Aspects of the present disclosure are described in Onaizi et al., "Harnessing zeolitic imidazolate framework-8 (ZIF-8) nanoparticles for enhancing $H_2S$ scavenging capacity of waste vegetable oil-based drilling fluids" published in Emergent Materials, which is incorporated herein by reference in its entirety.

STATEMENT OF ACKNOWLEDGEMENT

Support provided by the Deanship of Research Oversight and Coordination (DROC), King Fahd University of Petroleum and Minerals, Saudi Arabia through project number DF191027 is gratefully acknowledged.

BACKGROUND

Technical Field

The present disclosure is directed to a method of hydrogen sulfide scavenging, and more particularly, directed to a method of removing hydrogen sulfide ($H_2S$) from a subterranean geological formation with a zeolitic imidazolate framework in a waste cooking oil drilling fluid suspension.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hydrogen sulfide ($H_2S$) is a lethal and corrosive gas commonly encountered during well development stages in the oil and gas industry. It is naturally present in oil and gas formations due to the anaerobic decomposition of sulfate minerals and biomass by sulfate-reducing bacteria (SRB) and the thermochemical breakdown of sulfur compounds catalyzed by anhydrites present in subterranean formations. $H_2S$ is a toxic and flammable gas that becomes explosive when it forms a gaseous mixture with air within the concentration of 4 to 45% with an auto-ignition temperature of 232° C. Exposure to $H_2S$ is a major health and safety concern during drilling operations. The acidic nature of this gas makes it corrosive to metallic drilling equipment. $H_2S$ reacts with steel structures to produce free hydrogen ions and iron sulfide scales, failing the metallic structures and diminishing drilling equipment lifetimes by means of hydrogen embrittlement, sulfide cracking, and pitting corrosion. In addition to the corrosive nature of $H_2S$ to metallic structures, this gas is life-threatening when inhaled by working personnel for prolonged periods at even low concentrations and can potentially lead to severe injuries, chronic health complications, and, in some cases, death. According to the Occupational Health and Safety Administration (OSHA), the maximum exposure limit to $H_2S$ within a 10-minute period is 50 ppm. Moreover, the exposure of drilling fluids to $H_2S$ negatively imparts their rheological properties and, thus, their performance. The viscosity and density of the drilling fluids are altered when exposed to $H_2S$. The pH of drilling fluids containing $H_2S$ tends to decrease, making the fluid more acidic and corrosive due to the acidic nature of the $H_2S$. The exposure to $H_2S$ during drilling creates serious operational safety issues and economic losses in the oil and gas industry, and measures must be put in place to mitigate the exposure to this life-threatening gas and its subsequent effects. Various types of additives have been added to drilling fluids to increase their $H_2S$ scavenging capacities in order to limit the release of this lethal gas while maintaining the desired drilling fluid rheological properties. Examples of such additives include oxidants, transition metal compounds, amines, triazines, acrolein, aldehydes, and nitrates, among others. These additives remove $H_2S$ by either a surface adsorption or chemical reaction mechanism into insoluble sulfides. Some $H_2S$ scavengers also improve the general performance of drilling fluids.

Although several drilling fluid additives have been used in the past, most of the conventional additives suffer from drawbacks such as poor chemical and thermal stability and poor solubility in either aqueous or non-aqueous drilling fluids. Accordingly, an object of the present disclosure is to develop a method of removing $H_2S$ from subterranean geological formations that overcome the limitations of the art.

SUMMARY

In an exemplary embodiment, a method of removing hydrogen sulfide from a subterranean geological formation is described. The method includes mixing a zinc-imidazolate material with an organic liquid to form a drilling fluid suspension. The zinc-imidazolate material is present in an amount of 0.1 to 2.5 percent by weight of the drilling fluid suspension. The zinc-imidazolate material is a ZIF-8. The organic liquid includes one or more unsaturated oils. The drilling fluid suspension has a pH of 10 or more. The method includes further injecting the drilling fluid suspension in the subterranean geological formation, circulating the drilling fluid suspension in the subterranean geological formation and forming an oil-based mud, and scavenging hydrogen sulfide from the subterranean geological formation. The hydrogen sulfide is quenched in the zinc-imidazolate material during the scavenging.

In some embodiments, the zinc-imidazolate material has a Brunauer-Emmett-Teller (BET) surface area of 1100 to 1300 meters square per gram ($m^2/g$).

In some embodiments, the zinc-imidazolate material is porous and has a specific pore volume of 0.400 to 0.600 cubic meters per gram ($cm^3/g$). In some embodiments, the zinc-imidazolate material is porous and has an average pore size of 1 to 3 nanometers (nm).

In some embodiments, the zinc-imidazolate material is in the form of nanoparticles and has an average particle size of 15 to 25 nm.

In some embodiments, the organic liquid includes at least one or more unsaturated oils, a polysorbate, a gum Arabic, a copolymer, water, a sodium sulfonate, a starch, a bentonite, a hydroxide, a chloride salt, a carbonate salt, and a barite. In some embodiments, a volumetric ratio of the one or more unsaturated oils to the water is from 70:30 to 90:10 in the organic liquid. In some embodiments, the polysorbate is polysorbate 80.

In some embodiments, the one or more unsaturated oils includes at least triglycerides, a glycerol, triacylglycerols, diacylglycerols, monoacylglycerols, a linoleic acid, a stearic acid, an oleic acid, and a palmitic acid.

In some embodiments, the drilling fluid suspension scavenges 1800 to 1900 milligrams of hydrogen sulfide per one liter of the oil-based mud.

In some embodiments, a breakthrough time for the hydrogen sulfide in the presence of the drilling fluid suspension is 2 to 3 times greater compared to a breakthrough time for the hydrogen sulfide in the presence of the drilling fluid suspension without the zinc-imidazolate material.

In some embodiments, a saturation time for the hydrogen sulfide in the presence of the drilling fluid suspension is 4 to 5 times greater compared to a saturation time for the hydrogen sulfide in the presence of the drilling fluid suspension without the zinc-imidazolate material.

In some embodiments, a breakthrough capacity for the hydrogen sulfide in the presence of the drilling fluid suspension is 2 to 3 times greater compared to a breakthrough capacity for the hydrogen sulfide in the presence of the drilling fluid suspension without the zinc-imidazolate material.

In some embodiments, a saturation capacity for the hydrogen sulfide in the presence of the drilling fluid suspension is 3 to 4 times greater compared to a saturation capacity for the hydrogen sulfide in the presence of the drilling fluid suspension without the zinc-imidazolate material.

In some embodiments, a plastic viscosity of the drilling fluid suspension is to 5 to 40% lower compared to a plastic viscosity of the drilling fluid suspension without the zinc-imidazolate material. In some embodiments, an apparent viscosity of the drilling fluid suspension is to 7 to 50% lower compared to an apparent viscosity of the drilling fluid suspension without the zinc-imidazolate material.

In some embodiments, the hydrogen sulfide is scavenged through uncoordinated open metal zinc (II) and basic nitrogen sites in the zinc-imidazolate material.

In some embodiments, the method further includes flowing hydrogen sulfide gas into the drilling fluid suspension.

In some embodiments, the hydrogen sulfide is at a concentration of 50 to 150 parts per million volumes with a balance to methane.

In some embodiments, the method includes flowing hydrogen sulfide gas into the drilling fluid suspension at a rate of 50 to 150 milliliters per minute (mL/min).

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof may be readily obtained as the same becomes better understood by reference to the following detailed description when considered in connection with the accompanying drawings, wherein.

DETAILED DESCRIPTION

Figure 1A:
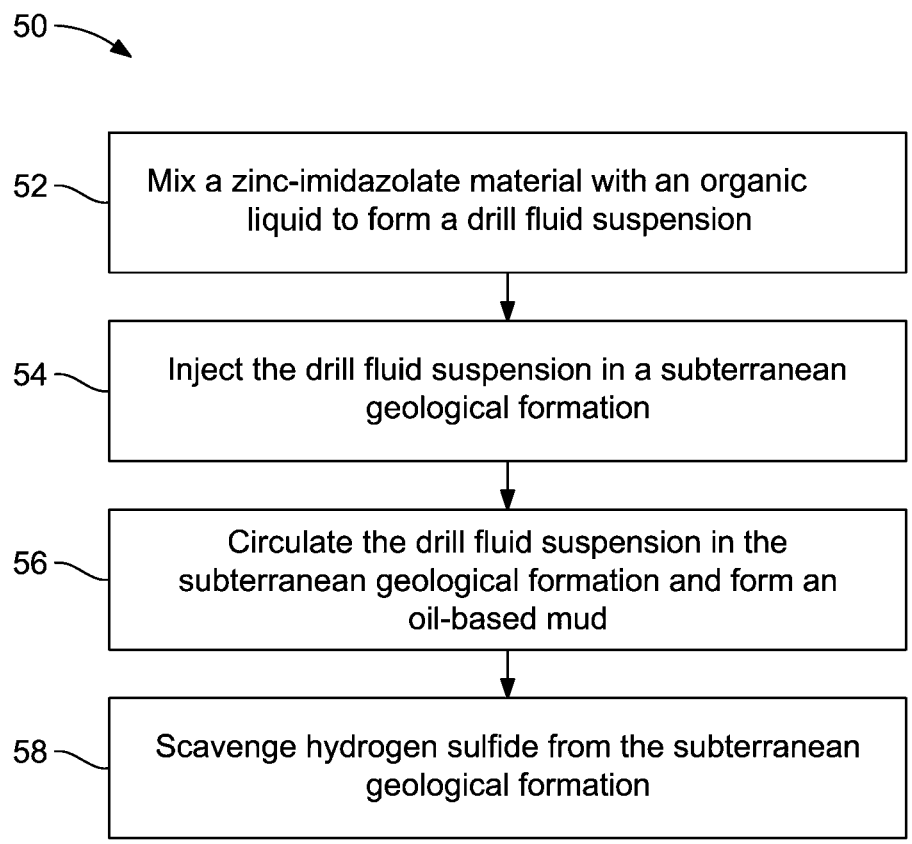
FIG. 1A is a flow chart of a method for removing hydrogen sulfide ($H_2S$) from a subterranean geological formation, according to certain embodiments.

In the following description, it is understood that other embodiments may be utilized, and structural and operational changes may be made without departure from the scope of the present embodiments disclosed herein.

References will now be made to specific embodiments or features, examples of which are illustrated in the accompanying drawings. In the drawings, whenever possible, corresponding or similar reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, the term "zeolitic material" or "zeolitic framework" refers to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and, if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also includes channels, channel intersections, and/or cages having dimensions in the range of 0.1-10 nanometers (nm), preferably 0.2-5 nm, and more preferably 0.2-2 nm. Water molecules may be present inside these channels, channel intersections, and/or cages. Zeolites which are devoid of aluminum may be referred to as "all-silica zeolites" or "aluminum-free zeolites." Some zeolites which are substantially free of, but not devoid of, aluminum is referred to as "high-silica zeolites." Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g., gonnardite, natrolite, mesolite, paranatrolite, scolecite, and tetranatrolite), edingtonite framework (e.g., edingtonite and kalborsite), thomsonite framework, analcime framework (e.g., analcime, leucite, pollucite, and wairakite), phillipsite framework (e.g., harmotome), gismondine framework (e.g., amicite, gismondine, garronite, and gobbinsite), chabazite framework (e.g., chabazite-series, herschelite, willhendersonite, and SSZ-13), faujasite framework (e.g., faujasite-series, Linde type X, and Linde type Y), mordenite framework (e.g., maricopaite and mordenite), heulandite framework (e.g., clinoptilolite and heulandite-series), stilbite framework (e.g., barrerite, stellerite, and stilbite-series), brewsterite framework, cowlesite framework, and the like.

Aspects of the present disclosure are directed to a method for removing hydrogen sulfide ($H_2S$) from a subterranean geological formation using a zeolitic imidazolate framework-8 (ZIF-8). The $H_2S$ scavenging performance of ZIF-8 nanoparticles (NPs) and its effect on the rheological and fluid loss properties of an oil-based drilling mud is studied and the results indicate that the incorporation of the ZIF-8 NPs into drilling fluids has been found to enhance the $H_2S$ scavenging performance and improve the plastic viscosity (PV) and apparent viscosity (AV) of the base mud.

FIG. 1A illustrates a flow chart of a method 50 for removing hydrogen sulfide from a subterranean geological formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure. The subterranean geological formation may include, but is not limited to, a depleted oil reservoir, a depleted gas reservoir, a sour reservoir, a hydrocarbon-bearing subterranean formation, a saline formation, an un-minable coal bed, and the like. In some embodiments, the method 50 may remove hydrogen sulfide from mixed production streams, water injection systems, produced water from an oil field, and the like.

At step 52, the method 50 includes mixing a zinc-imidazolate material with an organic liquid to form a drilling fluid suspension. In some embodiments, the zinc-imidazolate material is a ZIF-8. ZIF-8, a zinc imidazolate, offers several advantages due to the ease of fabrication, high production yield, robustness, high structural stability, strong hydrophobicity, super-oleophilicity, and great stability for long-term operations. The chemical stability of ZIF-8 makes it suitable to be utilized as an additive in both aqueous and non-aqueous drilling fluids for $H_2S$ scavenging. In some embodiments, ZIF-8 material may be substituted by and/or used in combination with other zeolitic materials such as, ZIF-1, ZIF-2, ZIF-3, ZIF-4, ZIF-5, ZIF-6, ZIF-7, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, ZIF-725, the like, and a combination thereof.

The imidazolate forms the organic ligand in the zinc-imidazolate ZIF-8 material. Imidazolate is the conjugate base of imidazole. Exemplary imidazole-based organic ligands include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl) methanol, 4-(hydroxymethyl)imidazole, 2-aminoimidazole, 4-(trifluoromethyl)-1H-imidazole, 4-cyanoimidazole, 3H-imidazole carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl)imidazole, 4,5-dicyanoimidazole, 4-imidazoleacetic acid, 4-methyl-5-imidazolemethanol, 1-(4-methyl-1H-imidazol-5-yl)methanamine, 4-imidazoleacrylic acid, 5-bromo-2-propyl-1H-imidazole, ethyl-(1H-imidazol-2-ylmethyl)-amine, 2-butyl-5-hydroxymethylimidazole, and the like.

The zinc-imidazolate material is present in the drilling fluid suspension in an amount of 0.1 to 2.5 percent by weight (wt. %), preferably 0.3 to 2.0 wt. %, more preferably 0.5 to 1.5 wt. %, and yet more preferably about 1.0 wt. % of the total weight of the drilling fluid suspension prior to injection into the subterranean geologic formation. In some embodiments, the zinc-imidazolate material has a Brunauer-Emmett-Teller surface area of 1100 to 1300 square meters per gram ($m^2/g$), more preferably 1150 to 1250 $m^2/g$, and yet more preferably about 1209 $m^2/g$. In some embodiments, the zinc-imidazolate material is porous and has an average pore size of 1 to 3 nm, more preferably 1.5 to 2.5 nm, and yet more preferably about 1.71 nm. In some embodiments, the zinc-imidazolate material is porous and has a specific pore volume of 0.4 to 0.6 cubic centimeters per gram ($cm^3/g$), more preferably 0.45 to 0.55 $cm^3/g$, and yet more preferably about 0.516 $cm^3/g$. In some embodiments, the zinc-imidazolate material is in the form of nanoparticles and has an average particle size of 15 to 25 nm, more preferably 18 to 22 nm, and yet more preferably 21.21 nm. In some embodiments, the nanoparticles may exist in various morphological shapes, such as nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, the like, and mixtures thereof.

In some embodiments, the zinc-imidazolate material may also include copper compounds, such as copper oxide, copper sulfate, copper molybdate, copper hydroxide, copper halide, copper carbonate, copper hydroxy carbonate, copper carboxylate, copper phosphate, copper hydrates, and copper derivatives thereof, calcium salts, cobalt salts, nickel salts, lead salts, tin salts, zinc salts, iron salts, manganese salts, zinc oxide, iron oxides, manganese oxides, triazine, monoethanolamine, diethanolamine, caustic soda, the like, and combinations thereof.

In some embodiments, the zinc-imidazolate material may be presented as a composite material with any other scavenger materials or supports including, but not limited to, non-metallic supports, such as graphene oxide, carbon nanotubes, and activated carbon, and/or metallic supports, such as layered double hydroxides, layered triple hydroxides, metal oxides, and zeolites. The zinc-imidazolate material may be synthesized by any method including, but not limited to, hydrothermal methods, solvothermal methods, and/or sol-gel methods and any morphology enhancing agent including any alkali or amine solution, but not limited to, $NH_4OH$ may be utilized.

In some embodiments, the organic liquid includes water such as tap water, distilled water, bi-distilled water, deionized water, deionized distilled water, reverse osmosis water, hard water, fresh water, brine/salt water, and the like, and a combination thereof. In some embodiments, the hard water and the freshwater may include salts of sodium, magnesium, calcium, potassium, ammonium, and iron, and the like and anions such as chloride, bicarbonate, carbonate, sulfate, sulfite, phosphate, iodide, nitrate, acetate, citrate, fluoride, nitrite, and the like. In some embodiments, the organic liquid includes distilled water as a dispersed phase to reduce cohesive forces between particles of the same type and enhanced dispersion of the ZIF-8.

In some embodiments, the organic liquid includes one or more unsaturated oils, preferably the liquid portion of the organic liquid consists of, or consists essentially of, the one or more unsaturated oils. The unsaturated oils may be one or more selected from triglycerides, glycerol, triacylglycerols, diacylglycerols, monoacylglycerols, a linoleic acid, a stearic acid, an oleic acid, and a palmitic acid. Suitable examples of unsaturated oils may include, but are not limited to, sunflower oil, safflower oil, rapeseed oil, olive oil, peanut oil, walnut oil, corn oil, vegetable oil, the like, and a combination thereof. The unsaturated oils form the majority liquid ingredient in the drilling fluid suspension, accounting for at least 50 percent by volume, preferably at least 60 percent by volume, more preferably at least 70 percent by volume, and yet more preferably at least 80 percent by volume of the drilling fluid suspension. The type of oil used in the organic liquid suspension affects the $H_2S$ performance of the drilling fluid suspension. Certain oils such as mineral and conventional diesel oils used in drilling fluid suspension have a substantial aromatic component. The unsaturated oils of the drilling fluid suspension are preferably free of aromatic components. In some embodiments, the one or more unsaturated oils are waste cooking oils. Waste cooking oil may refer to cooking oils that have been spent, cooked with, and/or otherwise used in cooking. Waste cooking oils (WCO), such as sunflower oil, safflower oil, rapeseed oil, olive oil, peanut oil, walnut oil, corn oil, vegetable oil, and the like, are a suitable alternative to toxic mineral oils. Waste cooking oils are eco-friendly, non-toxic, biodegradable, readily available, cheap, and do not create food competition when utilized in the drilling fluid suspension. The unsaturated oils act as a base fluid.

In some embodiments, the organic liquid includes a polysorbate. In some embodiments, the polysorbate may be a polysorbate 20, a polysorbate 40, a polysorbate 60, a polysorbate 80, the like, and a combination thereof. In a preferred embodiment, the polysorbate is polysorbate 80 or span 80. The polysorbate acts as a primary emulsifier. The volumetric ratio of the unsaturated oils to the water is from 70:30 to 90:10, preferably 75:25 to 85:15, and more preferably 80:20, in the organic liquid. The polysorbate acts as a primary emulsifier. In some embodiments, the organic liquid includes a gelling agent, such as gum Arabic. Certain other examples of gelling agents include a carbomer, a carrageenan, a chitosan, a gelatin, a pectin, a poloxamer, a poly(ethylene), a copolymer, such as poly(vinyl butyral-co-vinyl alcohol-co-vinyl acetate), and the like. The gelling agent may be used to impart viscosity and/or stabilize the drilling fluid suspension.

In some embodiments, the organic liquid further includes an emulsifier. In a preferred embodiment, the emulsifier is a sodium sulfonate, such as sodium dodecane-1-sulfonate, sodium decane-1-sulfonate, sodium octadecane-1-sulfonate, 1-octanesulfonic acid, sodium dodecylbenzene sulfonate, the like, and a combination thereof as a secondary emulsifier. The emulsifiers are utilized to enhance the dispersion of the scavenger.

In some embodiments, the organic liquid further includes an alkali metal halide salt. In some embodiments, the alkali metal halide salt is a chloride salt such as sodium chloride, potassium chloride, lithium chloride, rubidium chloride, cesium chloride, the like and a combination thereof. In a preferred embodiment, the alkali metal halide salt is potassium chloride. In some embodiments, the alkali metal salt acts as a shale stabilizer.

In some embodiments, the organic liquid further includes a starch. The starch acts as a fluid loss prevention agent. The fluid loss prevention agent is an additive of the drilling fluid suspension that controls loss of the drilling fluid suspension when injected into the subterranean geological formation. In some embodiments, the drilling fluid suspension may include multiple fluid loss prevention agents depending on the customized need of a user. In some embodiments, the other fluid loss prevention agents, such as polysaccharides, silica flour, gas bubbles (energized fluid or foam), benzoic acid, soaps, resin particulates, relative permeability modifiers, degradable gel particulates, hydrocarbons dispersed in fluid, one or more immiscible fluids, the like, and a combination thereof may be used as well. In some embodiments, the starch is a corn starch.

In some embodiments, the organic liquid further includes a bentonite. The bentonite may refer to potassium bentonite, sodium bentonite, calcium bentonite, aluminum bentonite, and combinations thereof, depending on the relative amounts of potassium, sodium, calcium, and aluminum in the bentonite. The bentonite acts as a viscosifier. The viscosifier is an additive of the drilling fluid suspension that increases the viscosity of the drilling fluid suspension. In some embodiments, the bentonite may be substituted by and/or used in combination with other viscosifiers that may include, but are not limited to, sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, and the like. In some embodiments, the viscosifier may further include a natural polymer such as a hydroxyethyl cellulose (HEC) polymer, a carboxymethylcellulose polymer, a polyanionic cellulose (PAC) polymer, and the like, or a synthetic polymer, such as poly(diallyl amine), diallyl ketone, diallyl amine, styryl sulfonate, vinyl lactam, laponite, polygorskites (such as attapulgite, sepiolite, and the like), a drilling polymer, a resonated polymer, a polyacrylate polymer, the like, and combinations thereof. A viscosifier may be used to increase a carrying capacity of the drilling fluid suspension.

In some embodiments, the organic liquid further includes a hydroxide. The hydroxide acts as a pH controller. The pH controller may include an alkali metal base. In some embodiments, the alkali metal base may include, but is not limited to, potassium hydroxide, lithium hydroxide, rubidium hydroxide cesium hydroxide, and sodium hydroxide. In some embodiments, a pH-adjusting agent, also referred to as a buffer, may include, but is not limited to, monosodium phosphate, disodium phosphate, sodium tripolyphosphate, and the like. In some embodiments, the pH of the drilling fluid suspension is acidic or neutral. In a preferred embodiment, the pH of the drilling fluid suspension is basic, with pH ranging from 7 to 14, preferably 8 to 13, more preferably 10 to 14, and yet more preferably 11 to 13. In some embodiments, the organic liquid further includes a carbonate, such as sodium carbonate, as a pH treatment source.

In some embodiments, the organic liquid further includes a barite as a weighting agent. The weighting agent is an agent that increases the overall density of the drilling fluid suspension to provide a sufficient bottom-hole pressure to prevent an unwanted influx of formation fluids. The density of the organic liquid includes all practical ranges and is not limited to 9 pounds-per-gallon (ppg). In some embodiments, the weighting agent may include but is not limited to, calcium carbonate, sodium sulfate, hematite, siderite, ilmenite, the like, and a combination thereof.

In some embodiments, the drilling fluid suspension may also include a deflocculant. Deflocculant is an additive of the drilling fluid suspension that prevents a colloid from coming out of suspension or slurries. In some embodiments, the deflocculant may include, but is not limited to, an anionic polyelectrolyte, for example, acrylates, polyphosphates, lignosulfonates (LS), tannic acid derivatives, for example, quebracho, the like, and a combination thereof.

In some embodiments, the drilling fluid suspension may also include a lubricant. In some embodiments, LUBE 1017OB may be used as the lubricant. In some embodiments, the lubricant may include, but is not limited to, polyalpha-olefin (PAO), synthetic esters, polyalkylene glycols (PAG), phosphate esters, alkylated naphthalenes (AN), silicate esters, ionic fluids, multiply alkylated cyclopentanes (MAC), the like, and a combination thereof.

In some embodiments, the drilling fluid suspension may also include a crosslinker. The crosslinker is an additive of the drilling fluid suspension that can react with multiple-strand polymers to couple molecules together, thereby creating a highly viscous fluid, with a controllable viscosity. The crosslinker may include but is not limited to, metallic salts, such as salts of aluminium, iron, boron, titanium, chromium, and zirconium, and/or organic crosslinkers, such as polyethylene amides and formaldehyde, the like, and a combination thereof.

In some embodiments, the drilling fluid suspension may also include a breaker. The breaker is an additive of the drilling fluid suspension that provides a desired viscosity reduction in a specified period. The breaker may include, but is not limited to, oxidizing agents, such as sodium chlorites, sodium bromate, hypochlorites, perborate, persulfates, peroxides, enzymes, the like, and a combination thereof.

In some embodiments, the drilling fluid suspension may include a biocide. The biocide is an additive of the drilling fluid suspension that may kill microorganisms present in the drilling fluid suspension. The biocide may include, but is not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, 2-bromo-2-nitro-1,3-propanedial, the like, and a combination thereof.

The drilling fluid suspension may also include a corrosion inhibiting agent. The corrosion inhibiting agent is a chemical compound that decreases the corrosion rate of a material, more preferably, a metal or an alloy, that meets the drilling fluid suspension. In some embodiments, the corrosion inhibiting agent may include, but is not limited to, imidazolines and amido amines. In some embodiments, the corrosion inhibiting agent may include, but is not limited to, oxides, sulfides, halides, nitrates, preferably halides, of metallic elements of group IIIa to VIa such as $SbBr_3$, the like, and a combination thereof.

The drilling fluid suspension may also include an anti-scaling agent. The anti-scaling agent is an additive of the drilling fluid suspension that inhibit the formation and precipitation of crystallized mineral salts that form scale. The anti-scaling agent may include, but is not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), polymers of sulfonic acid on a polycarboxylic acid backbone, and the like. In some embodiments, the anti-scaling agent may further include phosphine, sodium hexametaphosphate, sodium tripolyphosphate and other inorganic polyphosphates, hydroxy ethylidene diphosphonic acid, butane-tricarboxylic acid, phosphonates, itaconic acid, 3-allyloxy-2-hydroxy-propionic acid, the like, and a combination thereof. In some embodiments, the drilling fluid suspension may include metal sulfide scale removal agents such as hydrochloric acid and the like.

The drilling fluid suspension may also include a chelating agent. The chelating agent may include, but is not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA), the like, and a combination thereof. The concentration of components of the drilling fluid suspension may be varied to impart desired characteristics of the drilling fluid suspension.

At step 54, the method 50 includes injecting the drilling fluid suspension in the subterranean geological formation. In some embodiments, the drilling fluid is injected into the subterranean geological formation through a wellbore. In some embodiments, driving a drill bit to form a wellbore in the subterranean geological formation may lead to the production of a formation fluid. In some embodiments, the formation fluid may be a sour gas and/or a sour crude oil. The sour gas is a natural gas including an amount of the hydrogen sulfide. In some embodiments, the formation fluid may include, but are not limited to, natural gas (i.e., primarily methane), hydrocarbon or non-hydrocarbon gases (including condensable and non-condensable gases), light hydrocarbon liquids, heavy hydrocarbon liquids, rock, oil shale, bitumen, oil sands, tar, coal, water, the like, and/or combinations thereof. Further, the non-condensable gases may include, but are not limited to hydrogen, carbon monoxide, carbon dioxide methane, and the like. In some other embodiments, the formation fluid may be in the form of a gaseous fluid, a liquid, or a double-phase fluid. In some embodiments, the formation fluid includes the hydrogen sulfide. Microorganisms, such as sulfate reducing bacteria, may generate the hydrogen sulfide in gas and oil reservoirs. In some embodiments, some other method used or known in the art may lead to the formation of the hydrogen sulfide in the wellbore. The subterranean geological formation includes one or more hydrocarbons similar to the hydrocarbons present in the formation fluid.

At step 56, the method 50 includes circulating the drilling fluid suspension in the subterranean geological formation preferably forming an oil-based mud (OBM). Once the drilling fluid suspension is injected into the reservoir, it mixes with the sub-surface fluid and circulates in the subterranean geological formation to form the OBM. The OBM may be a water-in-oil emulsion with an oleaginous liquid serving as a continuous phase and water serving as the dispersed phase, alternately the OBM may be free of water and contain only the drilling fluid suspension and hydrocarbon based sub-surface derived fluids. Oil-based muds are preferred over water-based muds for drilling subterranean oil and gas formations due to their high thermal stability and drilling performance. OBMs can withstand high temperatures over prolonged periods of time, whereas water-based muds tend to break down and exhibit poor flow and high fluid loss at similar conditions. Moreover, OBMs offer certain advantages, such as shale stability, a faster rate of penetration, the prevention of salt leaching, enhanced gauge hole formation, and a high tolerance for sour gases and solids.

At step 58, the method 50 includes scavenging hydrogen sulfide from the subterranean geological formation. In some embodiments, the concentration of the zinc-imidazolate material may be adjusted according to the amount of hydrogen sulfide that may be encountered during the wellbore drilling. The hydrogen sulfide is quenched in the zinc-imidazolate material during the scavenging. In some embodiments, the hydrogen sulfide is quenched by reacting with the zinc-imidazolate material to form a hydrogen product and a sulfur product. In some embodiments, the hydrogen sulfide is quenched by being adsorbed, bonded, and/or otherwise attached to the zinc-imidazolate material. In some embodiments, the hydrogen sulfide is quenched by being scavenged through uncoordinated open metal zinc(II) sites and basic nitrogen sites in the zinc-imidazolate material. In some embodiments, the hydrogen sulfide is quenched by reacting with the zinc-imidazolate material and may be converted into stable insoluble sulfide, i.e., a hydrosulfide and/or elemental sulfur, and may be converted to elemental sulfur as well.

In some embodiments, the $H_2S$ scavenging performance of zinc-imidazolate material in the drilling fluid suspension may be evaluated by flowing hydrogen sulfide gas into the drilling fluid suspension. For this purpose, in some embodiments, the $H_2S$ gas is seeded in methane at a concentration of 50 to 150 parts per million volumes (ppmv), preferably 70 to 130 ppmv, more preferably 90 to 110 ppmv, and yet more preferably about 100 ppmv, with a balance to methane. In some embodiments, a flowing of the $H_2S$ gas is done at a rate of 50 to 150 mL/min, preferably 80 to 120 mL/min, more preferably 90 to 110 mL/min, and yet more preferably about 100 mL/min. In some embodiments, the drilling fluid suspension scavenges 1800 to 1900 milligrams of hydrogen sulfide per liter of the OBM (mg/L), preferably 1805 to 1870 mg/L, more preferably 1810 to 1840 mg/L, and yet more preferably 1812 to 1820 mg/L.

As used herein, the term "breakthrough time" refers to the time it took the outlet $H_2S$ concentration to reach 15 milligrams per cubic meter (mg m$^3$). In some embodiments, the breakthrough time for the hydrogen sulfide in the presence of the drilling fluid suspension is 2 to 3 times, preferably 2.05 to 2.5 times, more preferably 2.1 to 2.3 times, and yet more preferably about 2.13 times greater compared to the breakthrough time for the hydrogen sulfide in the presence of the drilling fluid suspension without the zinc-imidazolate material.

As used herein, the term "saturation time" refers to the time it took the outlet $H_2S$ concentration to reach 98 to 102 parts per million volume (ppmv), preferably 99 to 101 ppmv, and more preferably about 100 ppmv. In some embodiments, the saturation time for the hydrogen sulfide in the presence of the drilling fluid suspension is 4 to 5 times, preferably 4.1 to 4.8 times, more preferably 4.2 to 4.5 times, and yet more preferably about 4.3 times greater compared to the saturation time for the hydrogen sulfide in the presence of the drilling fluid suspension without the zinc-imidazolate material.

As used herein, the term "breakthrough capacity" refers to the amount of $H_2S$ adsorbed by the material during the breakthrough period. In some embodiments, the breakthrough capacity for the hydrogen sulfide in the presence of the drilling fluid suspension is 2 to 3 times, preferably 2.1 to 2.8 times, more preferably 2.2 to 2.6 times, and yet more preferably about 2.45 times greater compared to the breakthrough capacity for the hydrogen sulfide in the presence of the drilling fluid suspension without the zinc-imidazolate material.

As used herein, the term "saturation capacity" refers to the amount of $H_2S$ adsorbed by the material during the saturation period. In some embodiments, the saturation capacity for the hydrogen sulfide in the presence of the drilling fluid suspension is 3 to 4 times, preferably 3.1 to 3.8 times, more preferably 3.3 to 3.6 times, and yet more preferably about 3.5 times greater compared to the saturation capacity for the hydrogen sulfide in the presence of the drilling fluid suspension without the zinc-imidazolate material.

As used herein, the term "apparent viscosity" refers to the Bingham model where the value is one-half of the dial reading from a viscometer at 600 rpm of shear stress [Onaizi, S. A., Gawish, M. A., Murtaza, M., Gomaa, I., Tariq, Z., Mahmoud, M., $H_2S$ scavenging capacity and rheological properties of water-based drilling muds, *ACS Omega*, 2020, 5, 30729-30739, which in incorporated herein by reference in its entirety]. In some embodiments, the apparent viscosity of the drilling fluid suspension is 7 to 50%, preferably 10 to 40%, preferably 20 to 30% lower compared to the apparent viscosity of the drilling fluid suspension without the zinc-imidazolate material.

As used herein, the term "plastic viscosity" refers to the difference between the dial readings from a viscometer recorded at 600 rpm and 300 rpm. In some embodiments, the plastic viscosity of the drilling fluid suspension is 5 to 40%, preferably 7 to 35%, preferably 10 to 30%, preferably 15 to 25% lower compared to the plastic viscosity of the drilling fluid suspension without the zinc-imidazolate material.

EXAMPLES

The following examples demonstrate the method for removing hydrogen sulfide ($H_2S$) from a subterranean geological formation. The examples are provided solely for illustration and are not to be construed as limitations of the present disclosure, as many variations thereof are possible without departing from the spirit and scope of the present disclosure.

Example 1: Materials

Zinc nitrate hexahydrate (purity≥98%, Sigma-Aldrich), ammonium hydroxide (28-30% $NH_3$, Sigma-Aldrich), and 2-methylimidazole (purity≥99%, Sigma-Aldrich) were used for the preparation of ZIF-8. The base mud was formulated using waste cooking oil (the continuous phase), Span 80, gum Arabic, poly(vinyl butyral-co-vinyl alcohol-co-vinyl acetate), sodium dodecylbenzene sulfonate (SDBS), starch, bentonite, caustic soda, potassium chloride, sodium carbonate, barite, and distilled water (the dispersed phase). The function, the used quantity, the mixing order, and the mixing time of each of these materials are shown in Table 1. The ZIF-8 drilling mud formulations are composed of the above materials, in addition to different concentrations of ZIF-8 contents, particularly, 0.25 wt. %, 0.5 wt. %, 0.75 wt. %, and 1.0 wt. %. The waste cooking oil was obtained locally. All additives were used as received without any further purification.

Example 2: Synthesis of ZIF-8

Figure 1B:
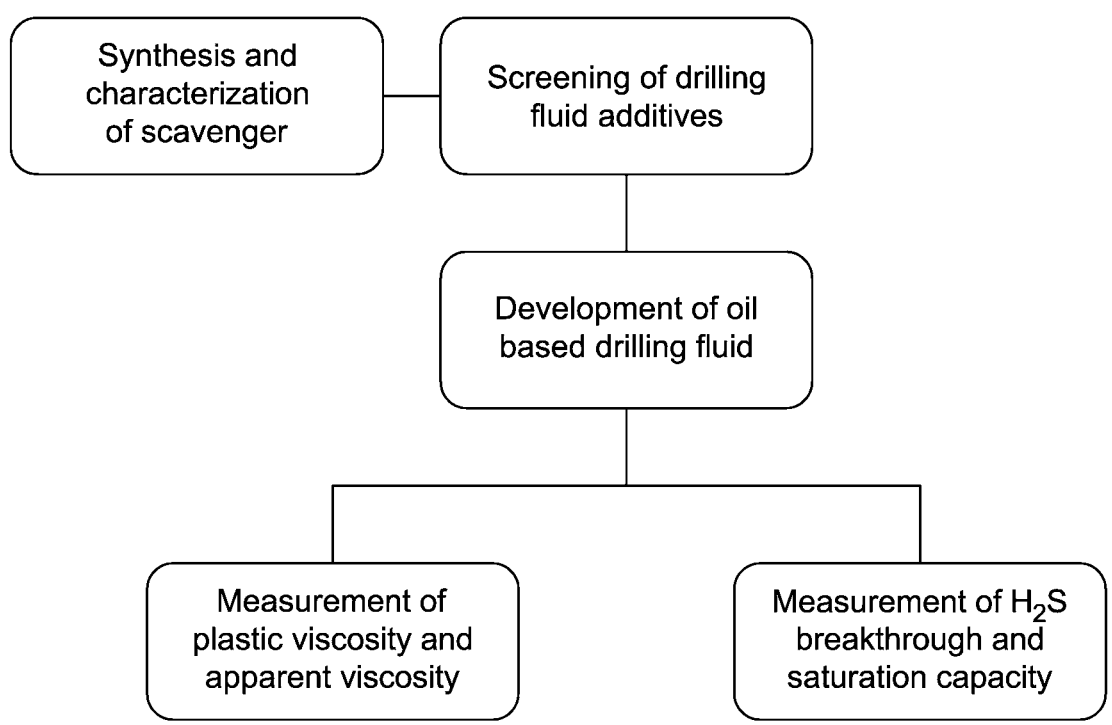
FIG. 1B is a schematic illustration depicting the steps carried out in the present disclosure, according to certain embodiments.
Figure 2A:
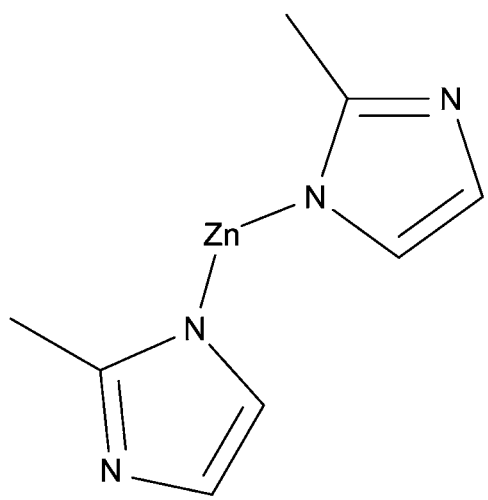
FIG. 2A depicts a chemical formula of zeolitic imidazole framework-8 (ZIF-8), according to certain embodiments.
Figure 2B:
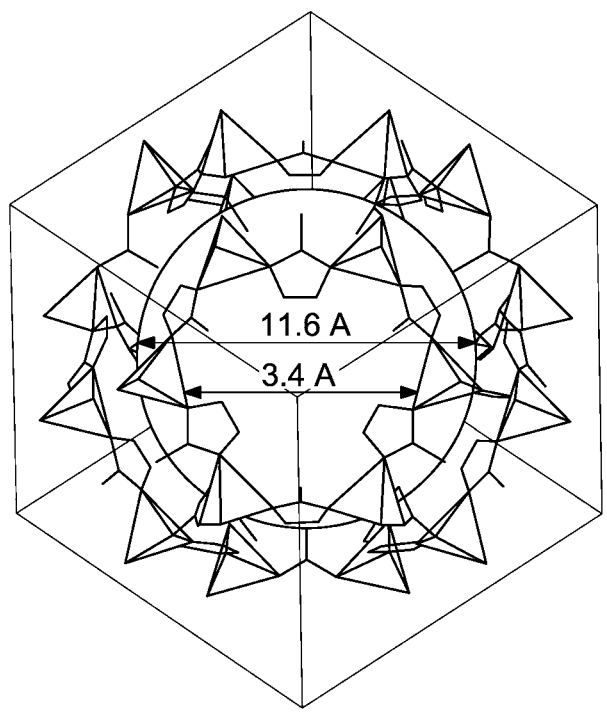
FIG. 2B depicts a three-dimensional (3D) crystallographic structure of the ZIF-8, according to certain embodiments.

To synthesis the ZIF-8 NPs, 0.09 mol of $Zn(NO_3)_2 \cdot 6H_2O$ was dissolved in 80 mL distilled water, and 0.18 mol of 2-methylimidazole was completely dissolved in 200 mL of aqueous $NH_4OH$ solution (3.1 mol of $NH_3$). The two solutions (i.e., 2-methylimidazole and zinc solution) were mixed, resulting in a milky suspension that was stirred continuously for 30 minutes to form ZIF-8 complex [Li, Y., Zhou, K., He, M., Yao, J., Synthesis of ZIF-8 and ZIF-67 using mixed base and their dye adsorption. *Microporous Mesoporous Mater.*, 2016, 234, 287-292; and He, M., Yao, J., Lin, Q., Wang, K., Chen, F., Wang, H., Facile synthesis of zeolitic imidazolate framework-8 from a concentrated aqueous solution. *Microporous Mesoporous Mater.*, 2014, 184, 55-60, both of which are incorporated herein by references in their entirety]. The final suspension had a $Zn^{2+}$:2-Hmim:$NH_3$ molar ratio of 1:2:34. The produced white suspension was centrifuged at 10,000 rotations per minute (rpm) and washed with distilled water until the pH of the supernatant dropped to almost 7. The obtained ZIF-8 NPs were dried overnight at 60° C. and sieved with a 450-micron mesh. The development of $H_2S$ scavenging materials and $H_2S$ scavenging experimental-related tests, the chemical formula of ZIF-8, and its 3-D crystallographic structure are shown in FIG. 1B; and FIGS. 2A-2B, respectively.

Example 3: ZIF-8 NPs Characterization

The X-ray diffraction (XRD) patterns were measured with the aid of Cu kα radiation at 40 kilovolts (kV) and 30 milliamperes (mA) and scanned over a range of 5-35° to characterize and confirm the crystal structure and phases of the ZIF-8 NPs. The Fourier-transform infrared (FTIR) spectra were measured over a wavenumber of 400 to 4000 inverse centimeters ($cm^{-1}$) with 32 scans using the KBr wafer technique to identify the surface functional groups. The $N_2$ adsorption-desorption isotherms were measured at a temperature of 77 K over a partial pressure range of about 0 to 1. Textural properties, such as Brunauer-Emmett-Teller (BET) specific surface area, pore volume, and pore size, were calculated using nitrogen adsorption/desorption isotherms. Further, the thermal stability of the ZIF-8 NPs was investigated by thermogravimetric analysis (TGA) under nitrogen gas in the temperature range of 30-800° C.

Example 4: Waste Vegetable Oil-Based Mud (WOBM) Formulation

The WOBM used had a volumetric oil-to-water ratio of 80:20 (see Table 1). The drilling mud was prepared by mixing various additives at indicated proportions to the waste vegetable oil (WO) as the continuous phase and the distilled water as the dispersed phase. All the additives were mixed sequentially with a laboratory mixer. Briefly, a primary emulsifier (span-80) was first dispersed in the continuous oil phase, then gelling agents (gum Arabic and copolymer) were added. The dispersed phase (water) was then added, followed by SDBS, starch, bentonite, caustic soda, potassium chloride, sodium carbonate, and barite. In the WOBM containing ZIF-8 NPs, the ZIF-8 NPs were added after the addition of the primary emulsifier (span-80). Each additive used in this formulation was mixed into the formulation according to the duration and sequence depicted in Table 1.

TABLE 1

Base and ZIF-8 drilling fluid compositions

| Mixing order | Mixing time (min) | Additives | Function | Quantities |
| --- | --- | --- | --- | --- |
| 1 | | Waste vegetable oil | Base fluid | 440 ml |
| 2 | 5 | ZIF-8 NPs | H2S scavenger | 0-1 wt. % |
| 3 | 15 | Span 80 | Primary emulsifier | 8 g |
| 4 | 15 | Gum Arabic | Gelling agent | 5 g |
| 5 | 15 | Copolymer[a] | Gelling agent | 2 g |
| 6 | 10 | Distilled water | Liquid phase | 110 mL |
| 7 | 20 | SDBS | Secondary emulsifier | 5 g |
| 8 | 20 | Starch | Fluid loss control agent | 5 g |
| 9 | 20 | Bentonite | Viscofier | 27 g |

TABLE 1-continued

Base and ZIF-8 drilling fluid compositions

| Mixing order | Mixing time (min) | Additives | Function | Quantities |
|---|---|---|---|---|
| 10 | 10 | Caustic soda | pH controller | 0.5 g |
| 11 | 5 | Potassium chloride | Shale stabilizer | 6 g |
| 12 | 5 | Sodium carbonate | pH treatment | 1.5 g |
| 13 | 20 | Barite | Weighting agent | 94 g |

[a]Poly(vinyl butyral-co-vinyl alcohol-co-vinyl acetate)

Example 5: Influence of the Scavenger on the Drilling Fluid Viscosity

The Bingham plastic model was adopted to calculate the plastic and apparent viscosities based on the dial readings recorded at 600 rpm and 300 rpm using equations 1 and 2, respectively. The plastic and apparent viscosities were measured with a viscometer (Model M3600, Grace Instrument) at 120° F. and 1 atm, as per the API standard procedure. The impact of the scavenger NPs on the drilling fluid viscosity was evaluated by preparing a series of drilling fluid formulations with varying concentrations of the $H_2S$ scavenger (0, 0.25, 0.5, 0.75, and 1 wt. %).

$$PV(cP) = \phi_{600rpm} - \phi_{300rpm} \quad (1)$$

$$AV(cP) = \phi_{600rpm}/2 \quad (2)$$

where $\phi_{600rpm}$ and $\phi_{300rpm}$ are dial readings at 600 rpm and 300 rpm, respectively.

Figure 3:
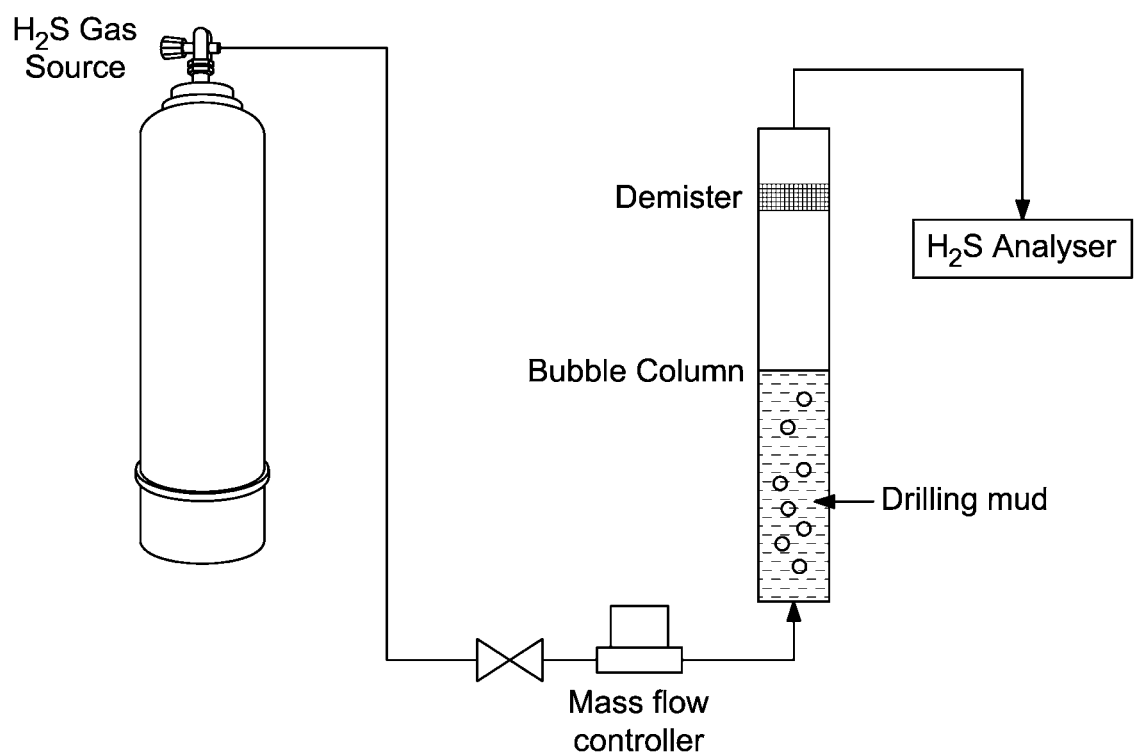
FIG. 3 depicts a schematic illustration of an experimental setup for $H_2S$ scavenging, according to certain embodiments.

Example 6: $H_2S$ Scavenging $H_2S$ scavenging tests were carried out to determine the breakthrough and saturation capacities of the drilling fluid formulations. The schematic illustration of the setup used in the present disclosure is shown in FIG. 3. The tests were conducted in a bubble column at room temperature and at atmospheric pressure. In each test, 10 grams of the drilling fluid sample is loaded into the bubble column. The $H_2S$ gas (100 ppmv, balance methane) stored in a gas cylinder was continuously passed into the bubble column containing the drilling fluid sample of interest, and the outlet gas concentration is continually monitored by an $H_2S$ detector (0.1 ppm detection limit) connected to the setup. The inlet $H_2S$ flow rate into the bubble column is maintained at 100 mL/min with a mass flow meter mounted on the setup. The outlet concentration of the $H_2S$ is measured until saturation time is reached for each drilling fluid sample. The $H_2S$ breakthrough and saturation capacities are calculated using equations 3 and 4, respectively.

$$\text{Breakthrough capacity (mg/L)} = (1.079 \times 10^{-2}) \rho_{H_2S} \int_0^{t_b} (100 - C_{out}) dt \quad (3)$$

$$\text{Saturation capacity (mg/L)} = (1.079 \times 10^{-2}) \rho_{H_2S} \int_0^{t_s} (100 - C_{out}) dt \quad (4)$$

where $t_b$ is the breakthrough time (min), $t_s$ is the saturation time (min), $C_{out}$ is the outlet $H_2S$ concentrations (ppmv), and $\rho_{H_2S}$ is density of $H_2S$ (1.391 mg/mL), respectively.

Example 7: Characterizations of the Synthesized ZIF-8 NPs

Figure 4:
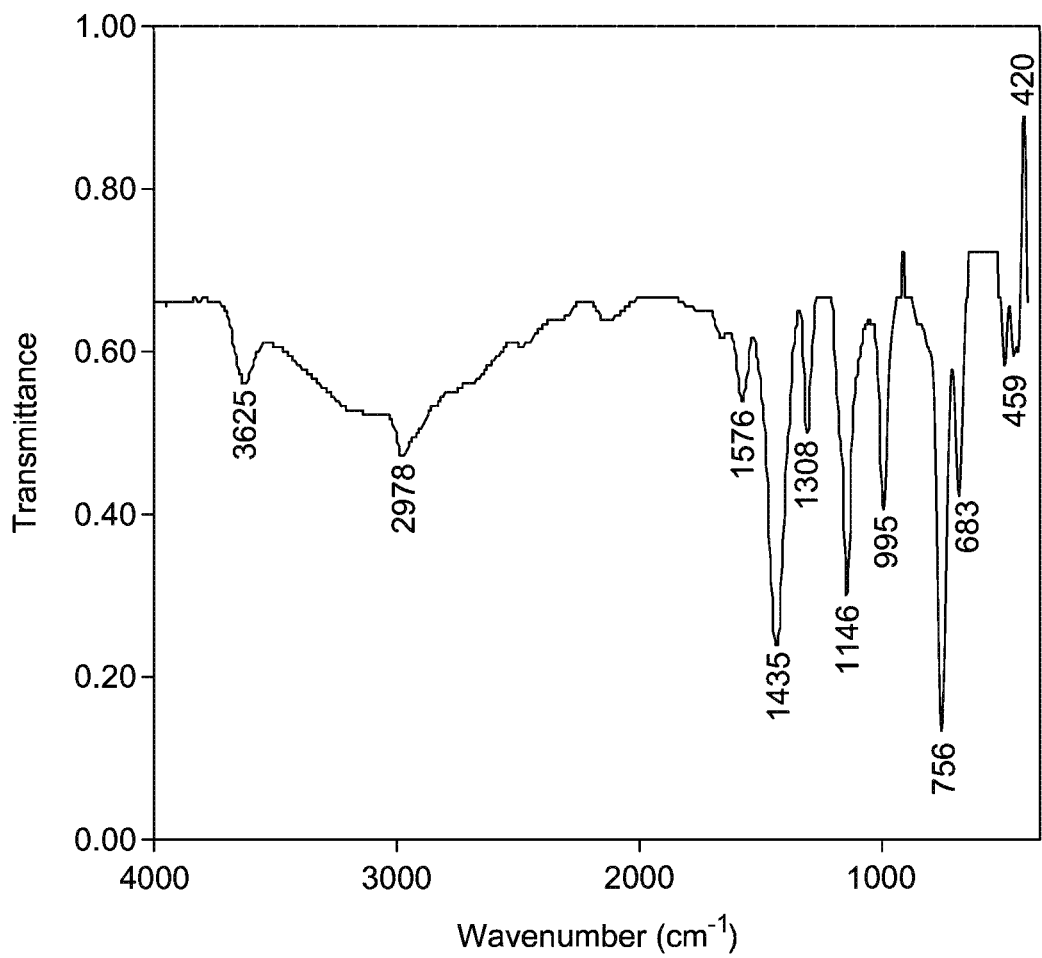
FIG. 4 depicts a Fourier-transform infrared spectroscopy (FTIR) spectrum of ZIF-8 nanoparticles (NPs), according to certain embodiments.

FIG. 4 depicts the FTIR spectrum of the synthesized ZIF-8 NPs. The peak at 3625 cm$^{-1}$ is attributed to the O—H vibrational stretching due to moisture present in the ZIF-8 sample or the KBr deliquescence [Y. Zhang, Y. Jia, L. Hou, Synthesis of zeolitic imidazolate framework-8 on polyester fiber for PM2.5 removal. RSC Adv., 8, 31471-31477 (2018), which is incorporated herein by reference in its entirety]. The peak at 2978 cm$^{-1}$ is related to the vibrational stretching of the C—H of the imidazole ring [H. Kaur, G. C. Mohanta, V. Gupta, D. Kukkar, S. Tyagi, Synthesis and characterization of ZIF-8 nanoparticles for controlled release of 6-mercaptopurine drug. J. Drug Deliv. Sci. Technol., 41, 106-112 (2017), which is incorporated herein by reference in its entirety]. The peak at 1576 cm$^{-1}$ corresponds to the C=N stretching vibration, while the peaks between 1435 cm$^{-1}$ and 683 cm$^{-1}$ are related to various stretching and bending vibrations of the entire imidazole framework and its constituents. The peaks between 459-420 cm$^{-1}$ indicate the Zn—N covalent bond vibrational stretch. Taken together, the observed peaks confirm the formation of ZIF-8 NPs.

Figure 5:
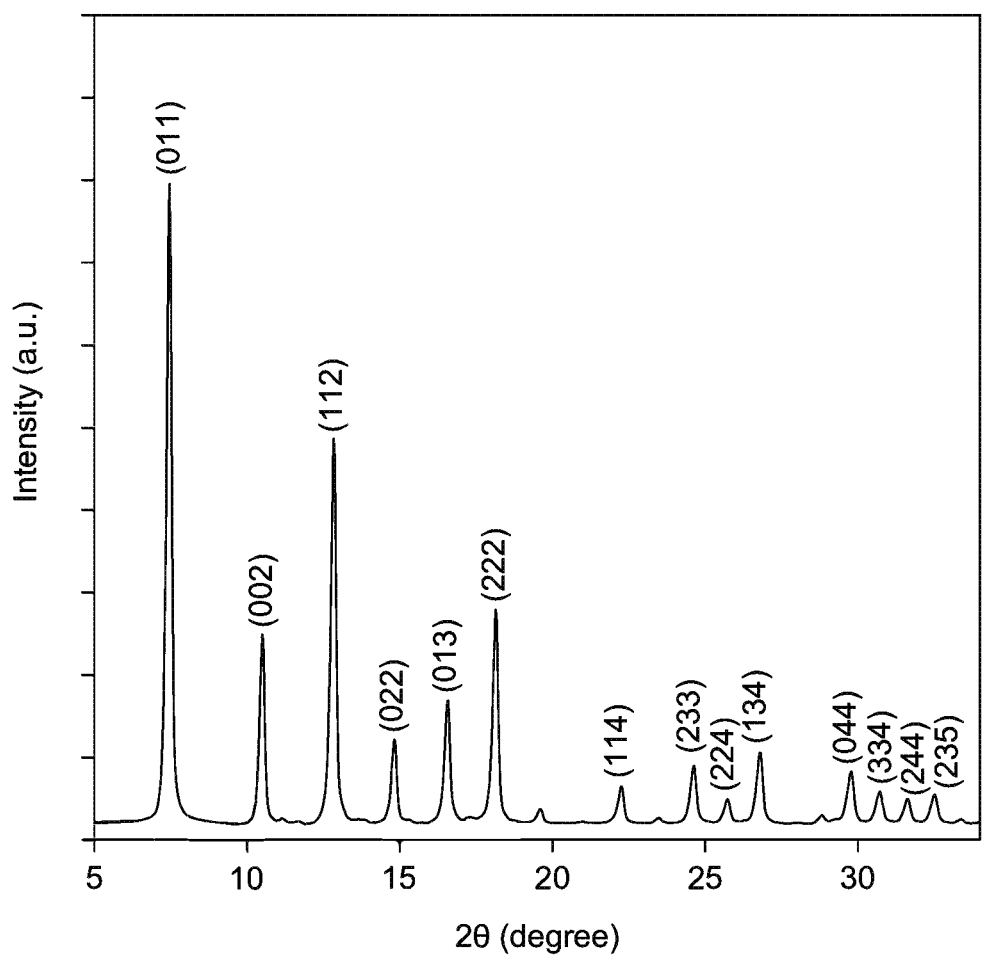
FIG. 5 depicts X-ray diffractogram (XRD) patterns of the ZIF-8 NPs, according to certain embodiments.

The XRD analysis of the synthesized ZIF-8 NPs was obtained to further ascertain the formation of the ZIF-8 NPs and to reveal the crystallinity and phase structure of the synthesized material. FIG. 5 depicts the XRD pattern of the synthesized ZIF-8 NPs, which shows diffraction peaks at 7.47°, 10.50°, 12.84°, 14.82°, 16.59°, 18.15°, 22.26°, 24.63°, 25.74°, 26.79°, 29.79°, 30.72°, 31.62°, and 32.52°, which correspond to (011), (002), (112) (022), (013), (222), (114), (233), (224), (134), (044), (334), (244), and (235) planes in the crystal structure of ZIF-8 NPs, respectively. The presence of the strong peaks indicates the high crystallinity of the ZIF-8 NPs [K. S. Park, Z. Ni, A. P. Côté, J. Y. Choi, R. Huang, F. J. Uribe-Romo, H. K. Chae, M. O'Keefe, O. M. Yaghi, Exceptional chemical, and thermal stability of zeolitic imidazolate frameworks. Proc. Natl. Acad. Sci. U.S.A., 103, 10186-10191 (2006), which is incorporated herein by reference in its entirety]. The peak positions and diffraction planes of the prepared ZIF-8 NPs confirm the formation of pure ZIF-8 NPs with sodalite-type (SOD) crystal structure.

Figure 6:
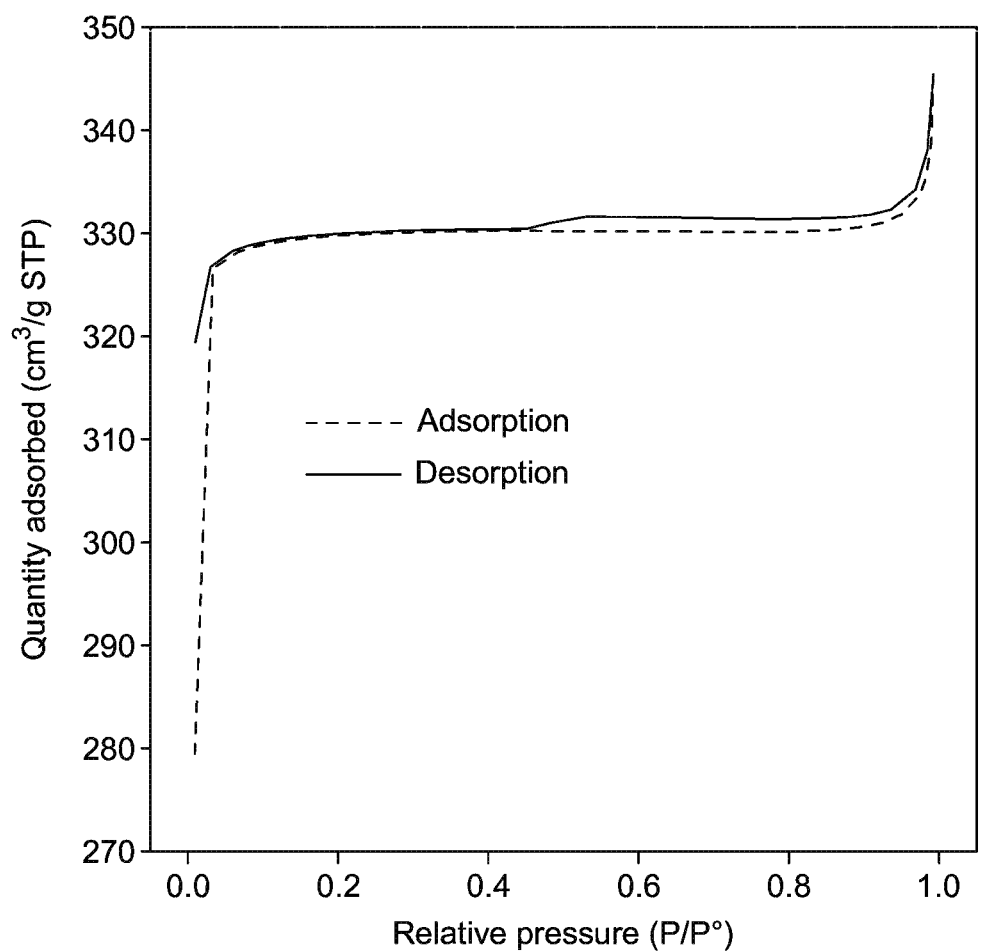
FIG. 6 depicts nitrogen ($N_2$) adsorption/desorption isotherms on/from the ZIF-8 NPs, according to certain embodiments.

FIG. 6 depicts the $N_2$ adsorption-desorption isotherms of the synthesized ZIF-8 NPs. The BET surface area, specific pore volume, average pore size, and average particle size of the ZIF-8 NPs were calculated from the sorption isotherm to be 1209 m$^2$/g, 0.516 m$^3$/g, 1.71 nm, and 21.21 nm, respectively. The synthesized ZIF-8 NPs sample exhibited a typical type I sorption isotherm. The sharp increase in the volume of the adsorbed $N_2$ at low partial pressure (P/P$_o$) is indicative of the microporosity of the ZIF-8 NPs. The H4-type hysteresis loop existing within the partial pressure range of 0.48-0.99 demonstrates the interparticle microporosity of the ZIF-8 NPs.

Figure 7:
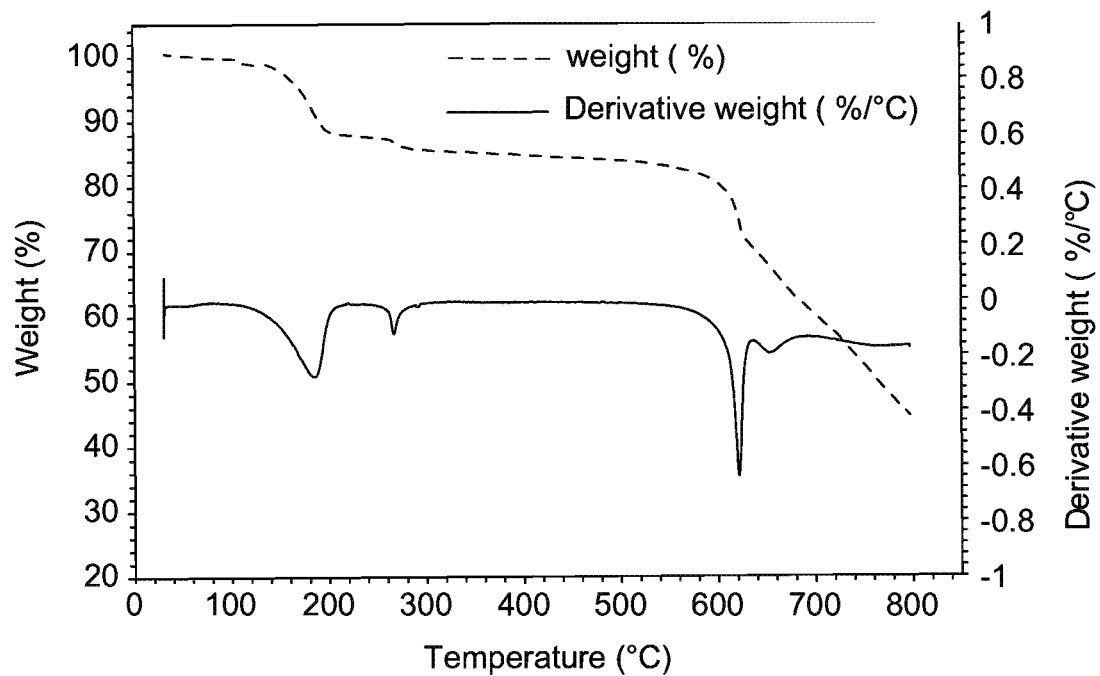
FIG. 7 depicts thermal stability of the ZIF-8 NPs measured using thermogravimetric analysis (TGA) under $N_2$ gas environment, according to certain embodiments.

Moreover, the thermal stability of the prepared ZIF-8 NPs is depicted in FIG. 7. The peaks in the derivative weight curve show the stages of thermal decomposition. The initial weight loss at ~180° C. corresponds to removing the adsorbed water moisture and guest molecules. The prepared ZIF-8 NPs exhibited good thermal stability up to −580° C., losing only about 19% of their original weight. Above this temperature, the structure of the ZIF-8 started decomposing. The results presented in FIG. 7 reveals that the prepared ZIF-8 material is thermally stable and, thus, suitable for $H_2S$ scavenging during drilling applications where the maximum reservoir temperature is lower than 580° C.

Example 8: $H_2S$ Scavenging

Figure 8:
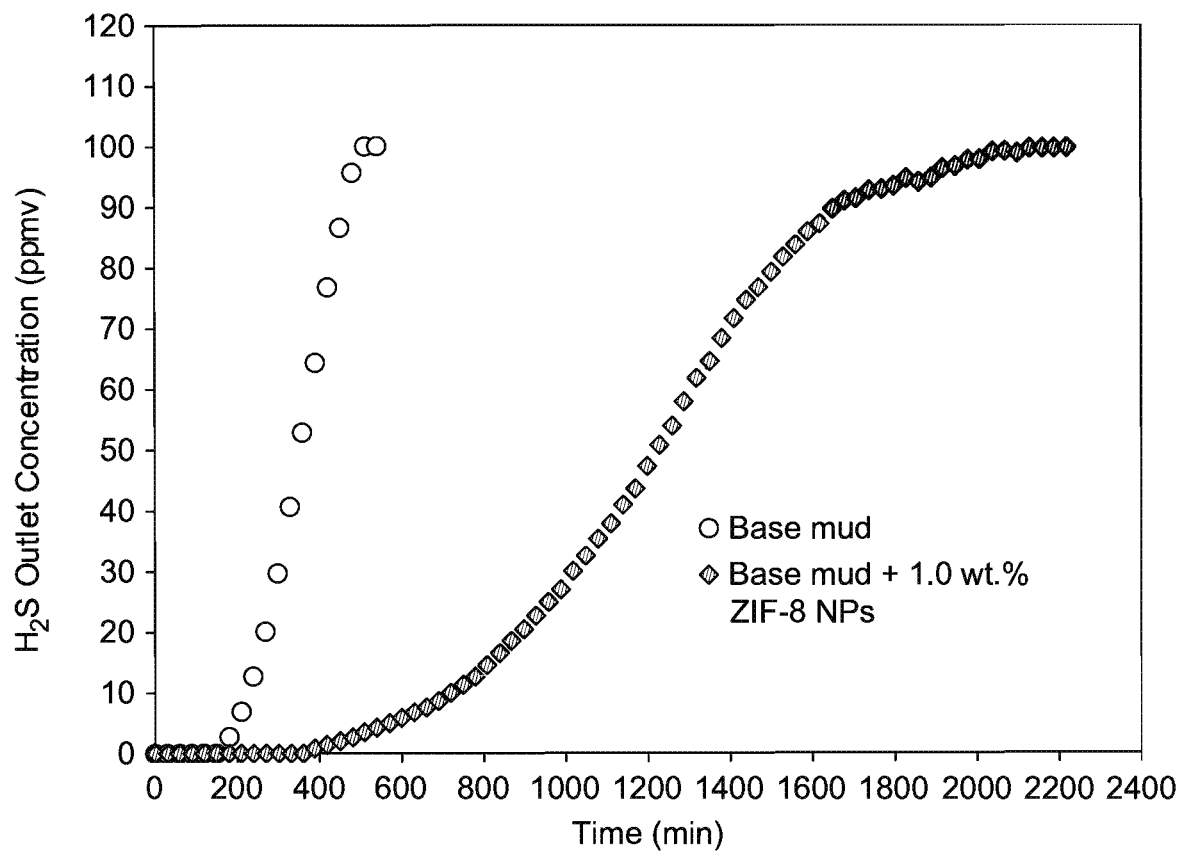
FIG. 8 depicts hydrogen sulfide ($H_2S$) breakthrough curves of a drilling fluid suspension, including base mud alone and base mud in combination with the ZIF-8 NPs, according to certain embodiments.
Figure 9:
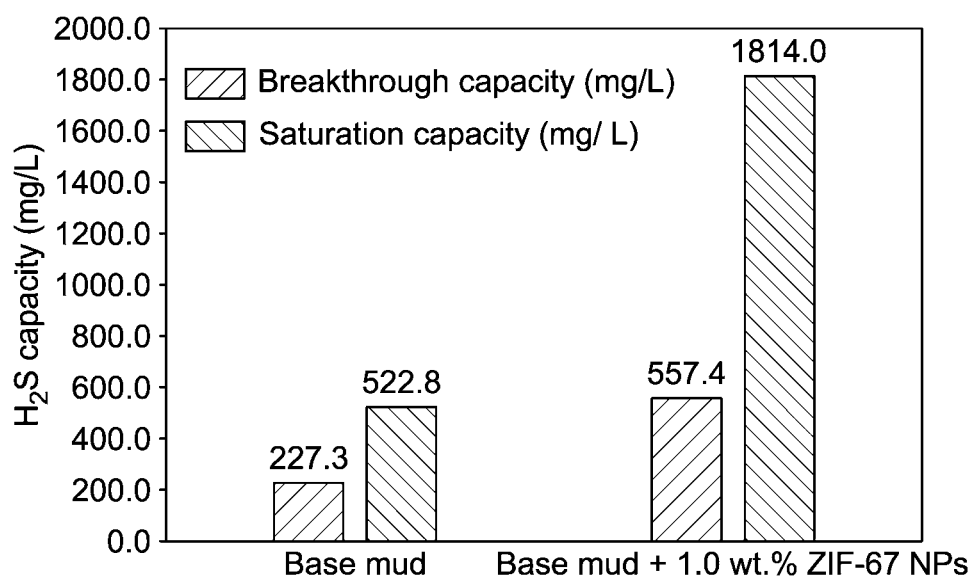
FIG. 9 depicts $H_2S$ scavenging capacities of the drilling fluid suspension, including base mud alone and base mud in combination with the ZIF-8 NPs, according to certain embodiments.

With the growing interest in utilizing more environmentally friendly materials for various applications and effective waste management, the utilization of waste for commercial applications is gaining momentum. Thus, waste cooking oil has been utilized to formulate oil-based muds comprising ZIF-8 NPs as an $H_2S$ scavenger. The $H_2S$ scavenging performance of the ZIF-8 NPs was determined by bubbling $H_2S$ through the WOBM formulation until the point of saturation when all the scavenging sites present on the ZIF-8 NPs surface are utilized, and the concentration of $H_2S$ in the outlet gas stream is the same as in the inlet gas stream (i.e., 100 ppmv). The $H_2S$ scavenging capacities were determined for the base and the 1 wt. % scavenger containing mud. FIG. 8 depicts the $H_2S$ breakthrough curve of the drilling mud formulations. The measured scavenging capacities of the respective mud samples are shown in FIG. 9. The base mud had a breakthrough time and a saturation time of about 150 minutes and 500 minutes, respectively, corresponding to $H_2S$ breakthrough and saturation capacities of 227.3 and 522.8 mg of $H_2S$/L of mud, respectively. The $H_2S$ scavenging capacity of this base mud is large when compared with certain aqueous base drilling fluids without any scavenger. The observed scavenging capacity of the base mud results from the presence of metal ions in the mud and the solubility of $H_2S$ in the dispersed aqueous phase of formulation.

As seen in FIG. 8 and FIG. 9, the incorporation of 1 wt. % ZIF-8 NPs into the base mud enhances the $H_2S$ scavenging performance. At breakthrough, the scavenging capacity of the base mud with the added ZIF-8 NPs was increased by almost 150% compared to the base mud. Similarly, the $H_2S$ scavenging capacity at saturation of the ZIF-8 NPs-containing mud was enhanced by 245%. These increases in $H_2S$ scavenging capacity correspond to breakthrough and saturation times of about 320 minutes and 2150 minutes, and capacities of 557.4 and 1814.0 mg of $H_2S$/L of mud, respectively. The increase in the $H_2S$ scavenging capacity of the base mud upon the addition of ZIF-8 NPs is due to the surface properties of the added ZIF-8 NPs. The presence of uncoordinated metal sites ($Zn^{2+}$) and the surface nitrogen functional groups, in addition to the large specific surface area, affords the ZIF-8 NPs a substantive number of scavenging sites for enhanced sour gas scavenging performance.

Example 9: Effect of ZIF-8 NPs Addition on the PV of the WOBMs

Figure 10:
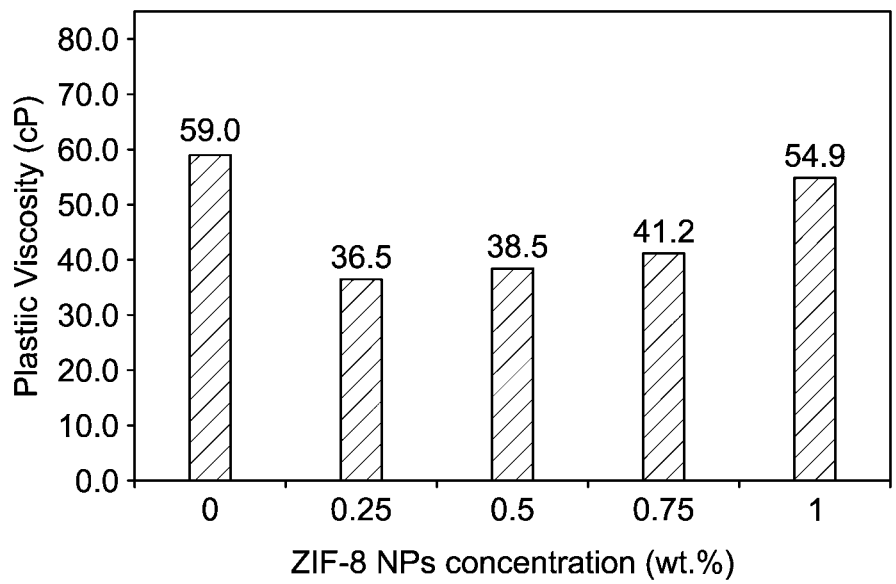
FIG. 10 depicts influence of the ZIF-8 NPs concentration on plastic viscosity (PV) of a waste vegetable oil-based mud (WOBM), according to certain embodiments.

Plastic viscosity (PV) is one rheological parameter used for analyzing the behavior of drilling mud systems, as it reflects the drilling fluid resistance to flow caused mainly by mechanical friction between solid particles. Plastic viscosity directly affects the rate of penetration, which is a parameter used in deciding the economics of the complete drilling process. FIG. 10 depicts the PV of the WOBM samples with different ZIF-8 NPs concentrations. As displayed in FIG. 10, the base WOBM has a PV of 59.0 cP, and upon addition of 0.25 wt. % ZIF-8 NPs, the PV is reduced by 38.2% (i.e., it dropped to 36.5 cP). The lowest value of the PV is measured at this ZIF-8 NPs concentration (0.25 wt. %). Within the range of ZIF-8 NPs concentrations studied, the base mud (0.0 wt. % ZIF-8 NPs) had the highest PV value. A gradual increase in PV from a value of 36.5 to 54.9 cP is observed with increasing the ZIF-8 NPs content from 0.25 to 1 wt. %, which might be attributed to the gradual increase in particulate friction within the mud as a result of increasing the solid content. The initial drop in PV of about 38.2% at 0.25 wt. % ZIF-8 NPs content could be attributed to the initial disruption of the gel formation within the drilling mud system. Moreover, the ZIF-8 NPs act as a ball bearing between larger particles in the mud, reducing inter-particulate friction, which resulted in the observed reduction in PV at 0.25 wt. %. Interestingly, this implies that such a lower concentration of ZIF-8 (i.e., 0.25 wt. %) could be used to reduce the PV value of viscous muds, which could enhance their circulation when necessary.

Example 10: Effect of ZIF-8 NPs Addition on the AV of the WOBMs

Figure 11:
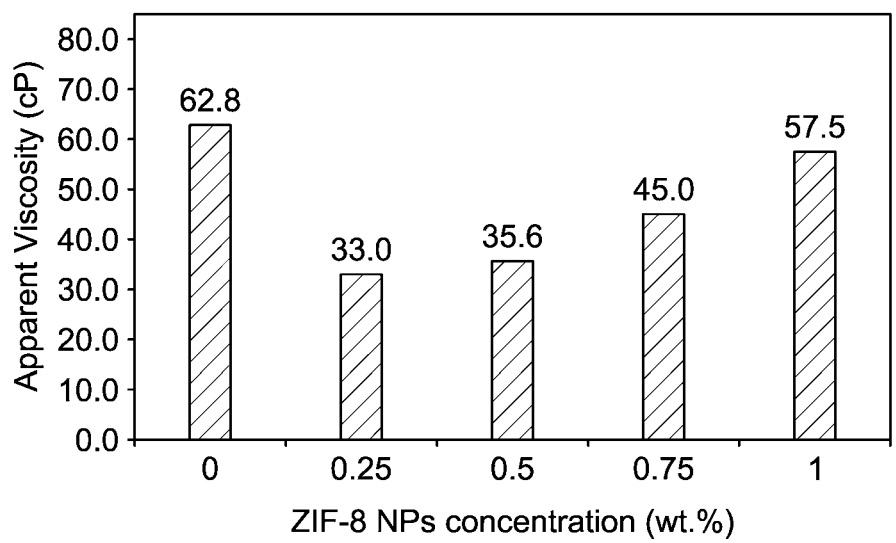
FIG. 11 depicts influence of the ZIF-8 NPs concentration on apparent viscosity (AV) of the WOBM, according to certain embodiments.

According to the Bingham model, the apparent viscosity (AV) is one-half of the dial reading at 600 rpm of shear stress. The apparent viscosity is also defined as the ratio of shear strain to shear stress and is usually regarded as the effective viscosity of drilling muds. For Newtonian fluids, the AV is generally constant; however, for non-Newtonian fluids such as drilling fluids, the AV is influenced by the shear rate and solid content of the fluid. FIG. 11 depicts the influence of ZIF-8 NPs on the AV of the WOBMs. The base mud had an AV of 62.8 cP. The AV was reduced by 47.5% upon the addition of 0.25 wt. % ZIF-8 NPs. The observed reduction in the AV value at 0.25 wt. % is thought to be due to the decrease in friction between large solid particles in the drilling fluid. At lower NPs concentrations, the resistance to flow reduces since the smaller NPs accumulate between the larger particles, thereby reducing inter-particulate friction. Further increase in the ZIF-8 NPs concentration beyond 0.25 wt. % resulted in a steady increase in AV from 33.0 to 57.5 cP at 1.0 wt. % ZIF-8 NPs concentration. This increase in AV value upon further addition of ZIF-8 NPs is thought to be due to increased interactions and frictions between the mud additives, increasing the resistance to flow. The observed AV trend in FIG. 11 is similar to the behavior observed in plastic viscosity with the addition of NPs.

Aspects of the present disclosure are directed toward a method of removing $H_2S$ from a subterranean geological formation. The present disclosure provides a method of application of ZIFs and MOFs, in general, in oilfield industries. The addition of ZIF-8 NPs for improving the scavenging capacity of oil-based drilling fluids formulated using waste cooking oil as the continuous phase was investigated. The effect of ZIF-8 NPs on the AV and PV of the drilling fluid was also evaluated. The results obtained from the present disclosure indicate that ZIF-8 NPs can be incorporated successfully into WOBM formulations to enhance the $H_2S$ scavenging performance. Moreover, the rheology and viscosity of the WOBMs are not adversely affected by the addition of ZIF-8 NPs, as revealed by the present disclosure. The incorporation of ZIF-8 NPs enhanced the $H_2S$ scavenging capacity of the base WOBM by about 150 and 245% at the breakthrough and saturation times, respectively. The ZIF-8 NPs incorporated into WOBMs demonstrated a good capacity for $H_2S$ scavenging. Moreover, the addition of ZIF-8 NPs did not drastically affect the AV and PV of the WOBMs. Both PV and AV showed a similar trend on increasing with the ZIF-8 NPs concentration in the mud. The lowest PV and AV values of 36.5 and 33.0 cP, respectively, were observed at 0.25 wt. % ZIF-8 NP content, most likely due to the reduced friction in the mud at such low NP concentrations. The zinc-imidazolate material is utilized for $H_2S$ removal from other fluid systems other than non-aqueous systems, such as the removal of $H_2S$ from water injection systems, produced water from an oil field, and hydrogen sulfide present in mixed production streams. The method of mitigating unwanted effects of $H_2S$ on the organic liquid that is exposed to $H_2S$ where the organic liquid is treated with the zinc-imidazolate scavenger disclosed herein and the product of the scavenger does not adversely affect the organic liquid rheology and fluid loss properties whereby the corrosion of metallic structures is simultaneously prevented.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of removing hydrogen sulfide from a subterranean geological formation, comprising:
    mixing a zinc-imidazolate material with an organic liquid to form a drilling fluid suspension,
    wherein the zinc-imidazolate material is present in an amount of 0.1 to 2.5 percent by weight of the drilling fluid suspension,
    wherein the zinc-imidazolate material is a ZIF-8,
    wherein the organic liquid comprises one or more unsaturated oils,
    wherein the drilling fluid suspension has a pH of 10 or more,
    injecting the drilling fluid suspension in the subterranean geological formation,
    circulating the drilling fluid suspension in the subterranean geological formation and forming an oil-based mud; and
    scavenging hydrogen sulfide from the subterranean geological formation,
    wherein the hydrogen sulfide is quenched in the zinc-imidazolate material during the scavenging; and
    wherein the hydrogen sulfide is scavenged through uncoordinated open metal zinc (II) and basic nitrogen sites in the zinc-imidazolate material.

2. The method of claim 1, wherein the zinc-imidazolate material is porous and has a specific pore volume of 0.400 to 0.600 cubic meter per gram ($cm^3/g$).

3. The method of claim 1, wherein the zinc-imidazolate material is porous and has an average pore size of 1 to 3 nanometers (nm).

4. The method of claim 1, wherein the zinc-imidazolate material is in the form of nanoparticles and has an average particle size of 15 to 25 nm.

5. The method of claim 1, wherein the drilling fluid suspension comprises at least one of an unsaturated oil, a polysorbate, a gum Arabic, a copolymer, water, a sodium sulfonate, a starch, a bentonite, a hydroxide, a chloride salt, a carbonate salt, and a barite.

6. The method of claim 5, comprising an unsaturated oil and wherein a volumetric ratio of the unsaturated oil to the water is from 70:30 to 90:10 in the organic liquid.

7. The method of claim 5, wherein the polysorbate is polysorbate 80.

8. The method of claim 1, wherein the unsaturated oil comprises at least one triglyceride, a glycerol, at least one triacylglycerol, at least one diacylglycerol, at least one monoacylglycerol, a linoleic acid, a stearic acid, an oleic acid, and a palmitic acid.

9. The method of claim 1, wherein the drilling fluid suspension consists of the zinc-imidazolate material, the unsaturated oil, a glycerol, a triacylglycerol, a diacylglycerol, a monoacylglycerol, linoleic acid, stearic acid, oleic acid, and palmitic acid.

10. The method of claim 1, wherein a breakthrough time for the hydrogen sulfide in the presence of the drilling fluid suspension is 2 to 3 times greater compared to a breakthrough time for the hydrogen sulfide in the presence of the drilling fluid suspension without the zinc-imidazolate material.

11. The method of claim 1, wherein a saturation time for the hydrogen sulfide in the presence of the drilling fluid suspension is 4 to 5 times greater compared to a saturation time for the hydrogen sulfide in the presence of the drilling fluid suspension without the zinc-imidazolate material.

12. The method of claim 1, wherein a breakthrough capacity for the hydrogen sulfide in the presence of the drilling fluid suspension is 2 to 3 times greater compared to a breakthrough capacity for the hydrogen sulfide in the presence of the drilling fluid suspension without the zinc-imidazolate material.

13. The method of claim 1, wherein a saturation capacity for the hydrogen sulfide in the presence of the drilling fluid suspension is 3 to 4 times greater compared to a saturation capacity for the hydrogen sulfide in the presence of the drilling fluid suspension without the zinc-imidazolate material.

14. The method of claim 1, wherein a plastic viscosity of the drilling fluid suspension is to 5 to 40% lower compared to a plastic viscosity of the drilling fluid suspension without the zinc-imidazolate material.

15. The method of claim 1, wherein an apparent viscosity of the drilling fluid suspension is to 7 to 50% lower compared to an apparent viscosity of the drilling fluid suspension without the zinc-imidazolate material.

16. A method of removing hydrogen sulfide from a subterranean geological formation, comprising:
    mixing a zinc-imidazolate material with an organic liquid to form a drilling fluid suspension,
    wherein the zinc-imidazolate material is present in an amount of 0.1 to 2.5 percent by weight of the drilling fluid suspension,
    wherein the zinc-imidazolate material is a ZIF-8,
    wherein the organic liquid comprises one or more unsaturated oils,
    wherein the drilling fluid suspension has a pH of 10 or more,
    injecting the drilling fluid suspension in the subterranean geological formation,
    circulating the drilling fluid suspension in the subterranean geological formation and forming an oil-based mud; and
    flowing hydrogen sulfide gas into the drilling fluid suspension; and
    scavenging hydrogen sulfide from the subterranean geological formation,
    wherein the hydrogen sulfide is quenched in the zinc-imidazolate material during the scavenging.

17. The method of claim 16, wherein the hydrogen sulfide is at a concentration of 50 to 150 parts per million volumes with a balance to methane in the subterranean geological formations.

18. The method of claim 16, wherein the flowing of hydrogen sulfide gas is done at a rate of 50 to 150 milliliters per minute (mL/min).

\* \* \* \* \*